United States Patent [19]

Peak

[11] E Re. 29,291

[45] Reissued July 5, 1977

[54] PORTABLE ANIMAL FEED BUNK AND METHOD OF FEEDING STACKED OR BALED HAY

[76] Inventor: Leonard R. Peak, Lacona, Iowa 50139

[22] Filed: June 4, 1976

[21] Appl. No.: 692,805

Related U.S. Patent Documents

Reissue of:

[64] Patent No.: 3,851,624
Issued: Dec. 3, 1974
Appl. No.: 404,673
Filed: Oct. 9, 1973

[52] U.S. Cl. ..... 119/60
[51] Int. Cl.[2] ..... A01K 5/00
[58] Field of Search ..... 119/60, 58, 17, 20

[56] References Cited

UNITED STATES PATENTS

| | | | |
|---|---|---|---|
| 597,214 | 1/1898 | Douglass | 119/17 |
| 1,319,060 | 10/1919 | Gardon | 119/60 |
| 3,020,881 | 2/1962 | Strom | 119/58 |
| 3,777,713 | 12/1973 | Deats | 119/60 |

*Primary Examiner*—Hugh R. Chamblee
*Attorney, Agent, or Firm*—Zarley, McKee, Thomte & Voorhees

[57] ABSTRACT

Three tubular rings are spaced apart by tubular vertical members. Animal-head openings are defined by the top and middle rings and the opposite vertical members. The space from the middle ring to the bottom ring is covered with woven-wire fencing material. The circular structure may be disassembled into three arcuate sections having angle-iron members at opposite ends with legs which overlap and are bolted together. An alternate embodiment is of a unitary construction. The method of using the circular feed bunk includes placing the hay on the ground and placing the feed bunk on its side adjacent the hay and then tipping the feed bunk onto and over the hay whereby the animals may feed on the hay through the animal-head openings. The bunk may be rolled between feeding stations when positioned on its side.

6 Claims, 7 Drawing Figures

PORTABLE ANIMAL FEED BUNK AND METHOD OF FEEDING STACKED OR BALED HAY

Matter enclosed in heavy brackets [ ] appears in the original patent but forms no part of this reissue specification; matter printed in italics indicates the additions made by reissue.

The production of hay in large round roll-type bales of 1,200 to 3,000 pounds involves feeding of the hay to farm animals in feed lots. The bale will be moved by a tractor to the feeding station. The usual practice is to allow the animals to gather round the bale and eat from it without restriction. This practice results in fifty per cent or more waste by the hay being trampled into the ground.

The portable animal feed bunk of this invention makes it possible to restrict the animals sufficiently to protect the hay from being wasted but allows the animals to feed at will through the head openings in the circular structure. As one bale is finished the circular structure may be rolled to a new dry feeding location and tipped over onto the bale for feeding to begin over again. The circular structure is light enough but yet strong enough to allow the animals to move the hay bunk so that they can get to the hay after it has been substantially eaten. Also, since the bunk is so movable it will not become frozen to the ground. Fencing material is provided around the bottom to prevent hay from being lost.

The bunk comprised essentially of three rings of tubular material interconnected and spaced apart by tubular vertical members. The head openings are formed by the vertical members and the upper and middle rings while the fencing material covers the area from the middle ring to the bottom ring. The bunk may be unitary in its construction or formed from three arcuate sections which include angle members at opposite ends having legs which will overlap and may be bolted together.

A preferred structure will be approximately 48 inches in height and have a diameter of eight feet and weigh approximately 175 pounds. A typical farmer may have up to four feed bunks on his farm and each one will feed up to fifty animals.

It is understood that other grains, including loose hay, may be placed in the feed bunk for animal feeding purposes.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
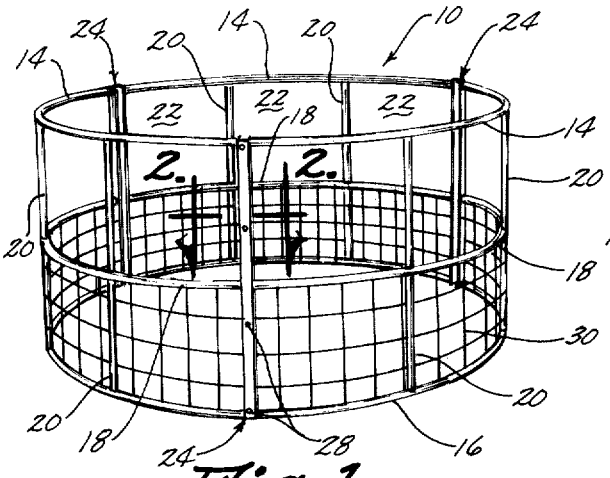
FIG. 1 is a side perspective view of the portable animal feed bunk.
Figure 3:
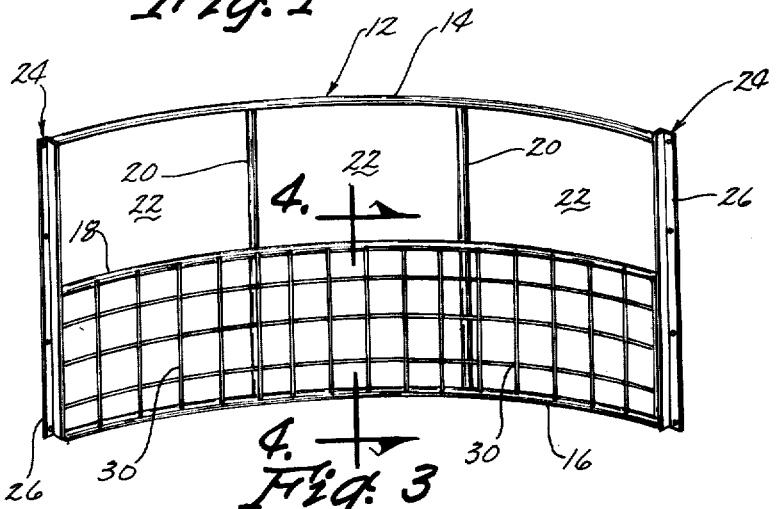
FIG. 3 is a side perspective view of one arcuate section.
Figure 4:
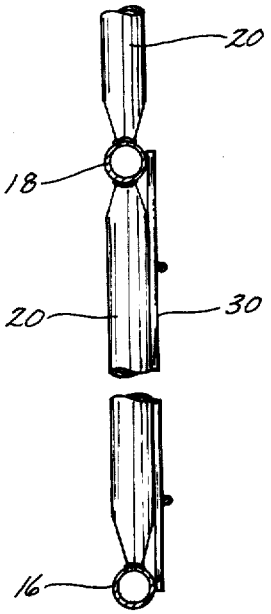
FIG. 4 is a cross sectional view taken along line 4—4 in FIG. 3.

The portable animal feed bunk of this invention is referred to generally in FIG. 1 by the reference numeral 10 and includes three arcuate sections 12 (FIG. 3). The feed bunk structure is formed from an upper ring 14, a bottom ring 16 and a ring 18 inbetween interconnected by vertical members 20. The rings 14, 16, 18, and vertical members 20 are formed from tubular material. The middle ring 18 cooperates with the top ring 14 and the vertical members 20 to form animal head openings 22.

Figure 2:
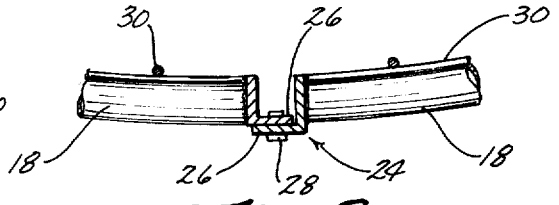
FIG. 2 is a cross sectional view taken along line 2—2 in FIG. 1.

The ends of the arcuate sections 12 include L-shaped angle members 24 and as seen in FIG. 2, legs 26 overlap for being connected together by bolts 28.

The bottom portion of the circular structure is covered by fencing material 30 and extends from the bottom ring 16 to the middle ring 18.

As seen in the embodiment of FIGS. 1–4, nine head openings 22 are provided with three in each section 12.

Figure 7:
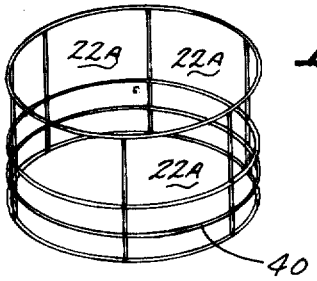
FIG. 7 is a reduced in scale perspective view of an alternate embodiment of the portable animal feed bunk.

An alternate embodiment is shown in FIG. 7 and includes six head openings 22A and an additional ring 40 which replaces the fencing material 30. Additionally, the structure of FIG. 7 is of a unitary design and is not intended to be disassembled.

Figure 5:
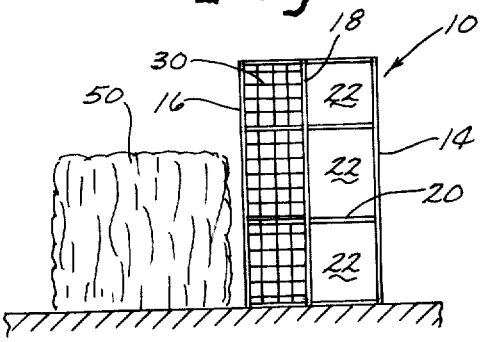
FIGS. 5 and 6 are diagrammatic views illustrating the method of feeding stacked or baled hay using the feed bunk.
Figure 6:
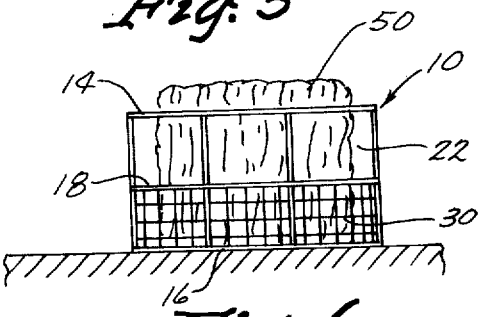

In use, the portable animal feed bunk 10 is first plated on its side, as seen in FIG. 5, and if necessary rolled to the location of the baled or stacked hay 50 such that the bottom side is adjacent the hay. Next, the bunk 10 is tipped onto and over the hay 50, as seen in FIG. 6, such that now the head openings 22 are positioned adjacent the hay for allowing the animals to feed thereupon. The hay against the ground is protected from being trampled upon by the animals and from escaping outside the feed bunk 10 by the fencing material 30 on the bottom of the bunk. As the hay is eaten up the animals can move the structure, due to its lightweight construction and thereby reach hay in the center of the unit. Ordinarily, after a single bale has been consumed, it is desirable to move to a new feeding area and thus the hay bunk may be drug or tipped back to its side position of FIG. 5 and then rolled to the new feeding area whereupon the procedure is repeated. If storage is desired, the bunk of FIGS. 1–4 may be easily disassembled by removal of the bolts 28 and, of course, shipment of the bunk is readily accomplished by the fact that the sections 12 will nest together readily. It is also noted that the bunk is light enough that one man may easily move it about and tip it from its side position to a position over the hay. It is further noted that other feeds may be placed in the bunk or the bunk may be placed over the feed materials.

I claim:

1. A portable animal feed bunk comprising, a plurality of arcuate frame sections having interconnected [overlapping] end portions forming a cylindrical feed bunk of substantially large diameter, open at opposite ends and along its length for free formed substantially large baled hay, said frame sections having a grid formed by vertical and horizontal members in spaced apart relationship with the substantial top half of said grid having large animal feeding grid openings and the substantial bottom half of said grid having hay retaining relatively smaller grid openings, and said feed bunk being light weight for rolling between use locations and tipping onto said large bales of hay.

2. The structure of claim 1 wherein said bottom half of said grid includes woven wire on said frame sections.

3. The structure of claim 1 wherein said horizontal members of said bottom half of said grid form a plurality of horizontally disposed ring members.

4. The structure of claim [1] 6 wherein said interconnected overlapping end portions are further defined as being L-shaped with legs of adjacent members being in overlapping relationship, and fasteners being provided for detachably interconnecting said overlapping legs.

5. The structure of claim 1 wherein said vertical and horizontal members are formed of tubular material.

*6. The structure of claim 1 wherein said interconnected end portions are overlapping.*

* * * * *